United States Patent
Lu et al.

(10) Patent No.: US 8,074,023 B2
(45) Date of Patent: Dec. 6, 2011

(54) IN-SYSTEM PROGRAMMING TO SWITCH MEMORY ACCESS FROM ONE AREA TO ANOTHER IN MEMORY CARDS

(75) Inventors: Chia-Ching Lu, Hsinchu (TW); Chao-Hsiang Huang, Hsinchu County (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 546 days.

(21) Appl. No.: 12/125,727

(22) Filed: May 22, 2008

(65) Prior Publication Data
US 2009/0292876 A1    Nov. 26, 2009

(51) Int. Cl.
*G06F 13/00* (2006.01)
*G06F 13/28* (2006.01)
(52) U.S. Cl. ........ 711/115; 711/154; 711/163; 711/170; 711/E12.008; 711/E12.091
(58) Field of Classification Search .......... None
See application file for complete search history.

(56) References Cited

U.S. PATENT DOCUMENTS

| | | | |
|---|---|---|---|
| 5,799,086 A * | 8/1998 | Sudia | 705/76 |
| 2003/0196028 A1* | 10/2003 | Maeda et al. | 711/103 |
| 2005/0144516 A1* | 6/2005 | Gonzalez et al. | 714/8 |
| 2007/0029393 A1* | 2/2007 | Suda | 235/492 |
| 2008/0046642 A1* | 2/2008 | Mori et al. | 711/103 |

FOREIGN PATENT DOCUMENTS

| | | |
|---|---|---|
| CN | 101093720 | 12/2007 |
| TW | 200820259 | 5/2008 |

* cited by examiner

*Primary Examiner* — Reginald Bragdon
*Assistant Examiner* — Eric S Cardwell
(74) *Attorney, Agent, or Firm* — Stroock & Stroock & Lavan LLP

(57) ABSTRACT

In-system programming to switch memory access from one area to another in memory cards is disclosed. A command to access a first area of a memory card is received. Access is switched from the first area of the memory card to a second area of the memory card if specified data follows the received command allowing for the memory access switch.

19 Claims, 4 Drawing Sheets

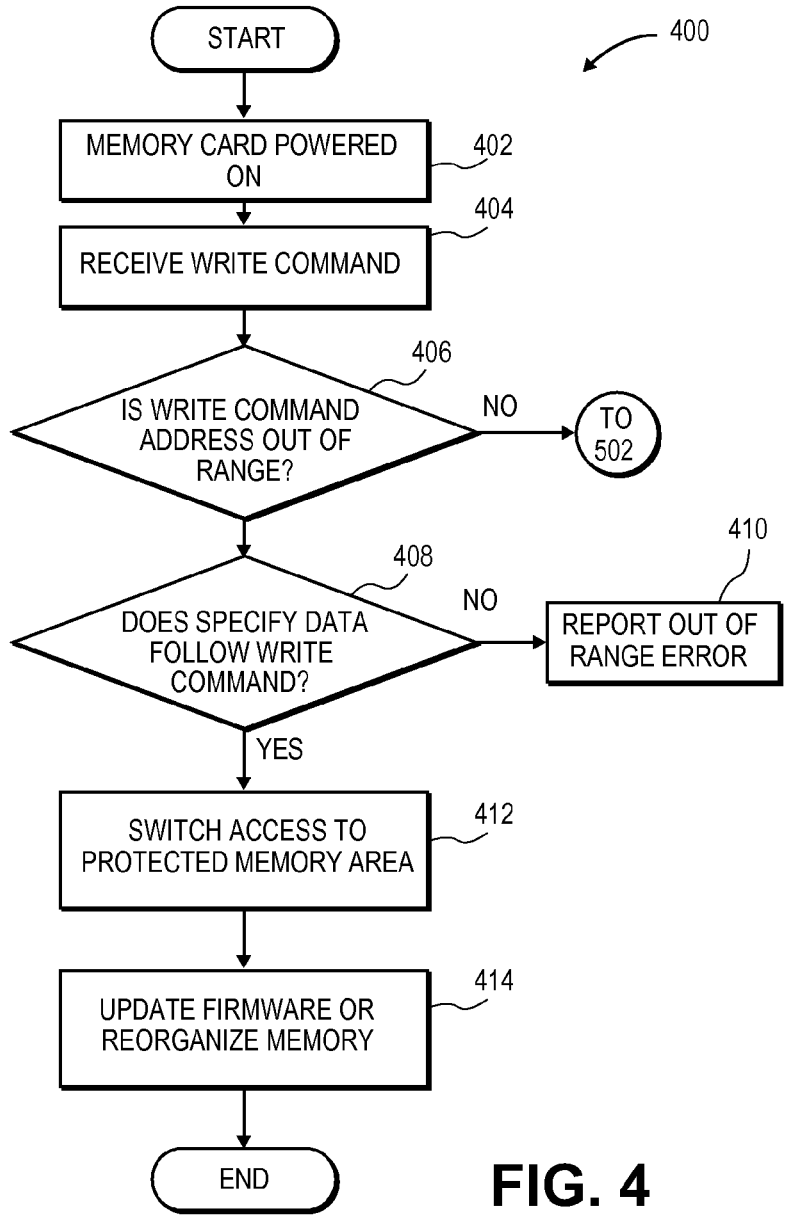

US 8,074,023 B2

IN-SYSTEM PROGRAMMING TO SWITCH MEMORY ACCESS FROM ONE AREA TO ANOTHER IN MEMORY CARDS

FIELD

This invention relates generally to memory devices and, more particularly, to in-system programming to switch memory access from one area to another in memory cards.

BACKGROUND

Today, electronic devices commonly use non-volatile memory devices such as, e.g., flash memory cards, compact flash (CF) cards, secure digital (SD) memory cards, multimedia cards, and memory sticks (MS)—("memory cards"), because of their compactness and ability to be reprogrammed. Typically, these memory cards include a micro-controller executing firmware to perform basic operations such as reading and writing data to memory. Often times, manufactures of memory cards need to update firmware for adding new features or fixing existing problems. Firmware, however, is usually stored in a protected memory. The memory card typically is not able to access the protected area to overwrite data there. Because of the need to update firmware in the memory card, memory card makers and card readers are configured to implement special commands that release access to those protected areas.

A normal user, however, may use multiple types of memory cards (e.g., SD card and MS card), and each memory card may be configured to process a different special command to release the protected area for firmware updating. For example, a SD card maker may use a "61" command to release the protected area, and a MS card maker may use an "85" command to release the protected area. This causes problems to the user because a SD memory card reader may recognize the "61" command, but may not recognize the "85" command used by the MS card for firmware updating. Thus, to update firmware in memory card, the user must send the memory card back to the manufacturer or go to a repair store that uses the proper card reader matching the special command used in the memory card. As a result, updating firmware has become inconvenient to users and increases costs to memory card manufacturers that require special card readers.

Furthermore, frequent reading and writing may cause damage to the normal area in the memory, which can be compensated/repaired by using backup area of memory. However, when the entire backup area is used, prior art devices are returned to the manufacturer. Such prior art devices do not utilize out of range areas or reserved areas of the master boot record (MBR) to increase the backup area, and are not capable of reorganizing portions of normal area of memory and using it as backup area of memory.

Thus, what is needed is an improved technique for updating firmware or reorganizing memory block.

SUMMARY

According to one aspect of the invention, a method for a memory card is disclosed. A command to access a first area of the memory card is received. Access is switched from the first area of the memory card to a second area of the memory card if specified data follows the received command allowing for the memory access switch.

According to another aspect of the invention, a memory card is disclosed comprising having a non-volatile memory and micro-controller. The non-volatile memory includes a first area and a second area. The micro-controller is configured to receive a command to access a first area of the memory card, and to switch access from the first area of the memory card to a second area of the memory card if specified data follows the received command allowing for the memory access switch.

According to another aspect of the invention, a method for a memory card is disclosed. A command is received to access bad memory blocks in memory and the memory having a pre-designated area of back up memory that is full. Memory blocks in the memory are reorganized and designated as back up memory blocks. Access from the bad memory blocks is switched to the back up memory blocks in the memory.

A command is received to access bad memory blocks in a first area of memory and the memory having a pre-designated area of back up memory that is full. A second area of memory is reorganized and portions of the second area of memory are designated memory as back up memory blocks. Access from bad memory blocks in the first area of memory is switched to the back up memory blocks in the second area of memory.

According to another aspect of the invention, a memory card is disclosed having a non-volatile memory and micro-controller. The non-volatile memory includes a pre-designated area of back up memory that is full, a first area of memory having one or more bad memory blocks, and a second area of memory. The micro-controller is configured to receive a command to access the one or more bad memory blocks in the first area of memory, to reorganize the second area of memory and designate portions of the second area of memory as back up memory blocks, and to switch access from the one or more bad memory blocks in the first area of memory to the back up memory blocks in the second area of memory.

BRIEF DESCRIPTION OF THE DRAWINGS

The accompanying drawings, which are incorporated in and constitute part of this specification, illustrate examples, implementations, and embodiments of the invention, and together with the description, serve to explain the principles of the invention. In the drawings.

FIG. 3 illustrates one example of a data format having specified data to allow for a memory access switch;

FIG. 4 illustrates an exemplary flow diagram of a method for updating firmware;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same. The following description provides techniques that overcome the disadvantages of requiring special commands and card readers for updating firmware in a memory card.

The following techniques provide in-system programming to switch memory access from one area to another in memory cards. According to one example, a command to access a first area of a memory card is received. Access is switched from the first area of the memory card to a second area of the memory card if specified data follows the received command allowing for the memory access switch.

The command can be, e.g., a standard write command or write block command, disclosed in standard memory card specifications. Such a write command can include an address designated for an unprotected, normal use area or outside of that range, along with specified data—i.e., unique code such as "XAX."

The micro-controller in the memory card can be configured to recognize that code to allow the write command to switch access from one memory area (e.g., a normal or unprotected area) to another memory area (e.g., a backup area of protected memory). Because unique specified data followed the command, the micro-controller is configured to release protected memory areas and, more specifically, the backup area or firmware area. Moreover, in this way, a standard write command, recognized by any memory card implementing standard card specifications, can be used to update firmware in the protected area of the memory card. In other examples, a write command having an address outside the range of the normal area can be used as well, if the specified data follows it. In another example, access to a memory area having bad memory blocks can be switched to a different memory area having good memory blocks. Other examples, embodiments, and implementations are detailed below.

Figure 1:
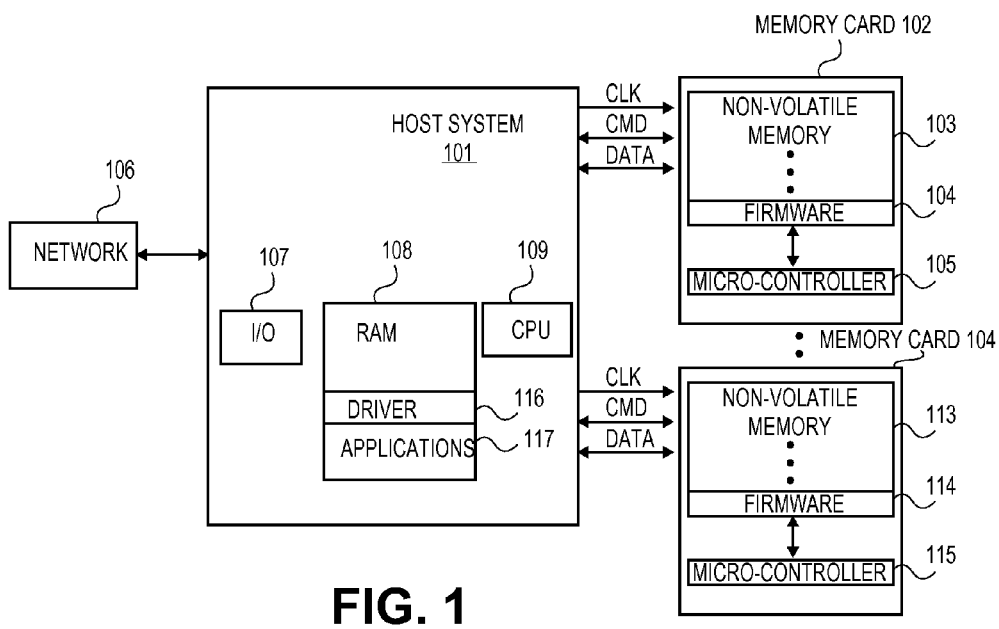
FIG. 1 illustrates one example of a host system connected to memory cards.

FIG. 1 illustrates examples of a host system 101 connected to a plurality of memory cards 102(1) through 104(N). In this example, the host system 101 communicates with memory cards 102 and 104 via clock "CLK", command "CMD", and data "DATA" lines. Examples of memory cards 102 and 104 include flash memory cards, compact flash (CF) cards, secure digital (SD) memory cards, secure digital input/output (SDIO) cards, multi-media cards, and memory sticks (MS), or other like memory devices. Each of the memory cards includes a respective micro-controller (105, 115) that processes corresponding firmware (104, 114) in non-volatile memory (103, 113). Micro-controllers 105 and 115 can process commands from host system 101 on the CMD line, which can be commands specified in standard card specifications, such as, e.g., the SD and SDIO card specifications.

Host system 101 includes a system bus (not shown) that can interconnect input and output interfaces I/O 107, a random access memory (RAM) 108, and central processing unit CPU 109. Other components can also be connected to host system 101, e.g., a display, keyboard, and other like I/O devices via I/O interfaces 107. RAM 108 includes a driver 116 and applications 117, which can be used to communicate with memory cards (102, 104) via an I/O interface 107 on CLK, CMD, and Data lines. Host system 101 can be connected to a network 106, which can include a wired or wireless network. Examples of such networks include local area networks LANs or wide area networks WANs such as the Internet.

Figure 2:
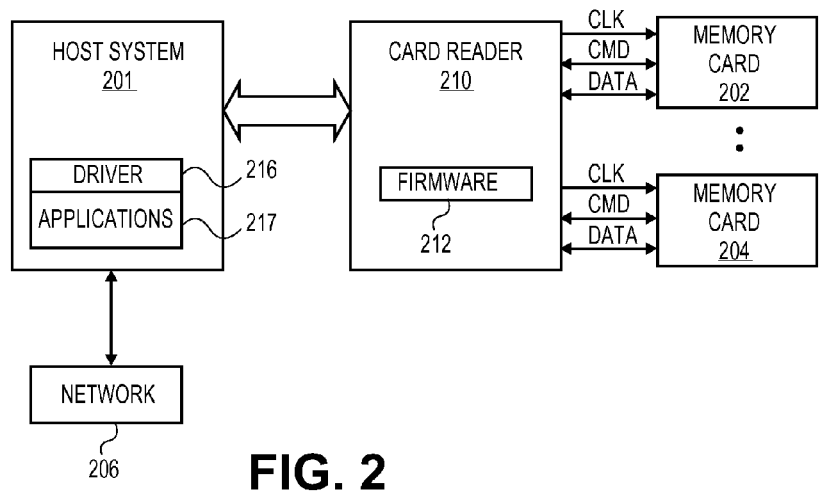
FIG. 2 illustrates one example of a host system connected to a card reader for receiving memory cards.

FIG. 2 illustrates one example of a host system 201 connected to a card reader 210 for receiving a plurality of memory cards 202(1) through 204(N). In this example, the host system 201 has an interface to card reader 210 with firmware 212 that can interface and communicate with a plurality of memory cards 202(1) through 204(N) using CLK, CMD, and Data lines. In this example, host system 210 need not provide multiple interfaces to communicate with multiple memory cards 202 and 204. Host system 201 can use driver 216 and applications 217 to communicate with card reader 210 to access and write data into memory cards (202, 204).

The following techniques can be implemented in the exemplary systems described in FIGS. 1 and 2.

FIG. 3 illustrates one example of a data format 300 for transmitting a write command from a host or card reader to a memory card, which allows the memory card to release protected areas of memory, such as the backup or firmware area, using specified data. In this example, the data format 300 includes a write command field 302, address field 304, and specified data field 306. Any type of command can be stored in command field 302. In one example, an address designated for a normal use area (unprotected area) or outside of the range for the normal area can be stored in the address field 304. Any unique combination of symbols, codes, numbers, or letters can be stored in the specified data field 306, which is understood by the micro-controller in the memory code to perform or allow a memory access switch. Commands including and address can be transmitted on the CMD line and data can be transmitted on Data lines. Alternatively, write commands, addresses, and specified data in command field 302, address field 304, and specified data field 306 can all be transmitted on the CMD line.

In one example, the write block or write multiple block commands include a command "24" or command "25"—recognized by the SDIO memory card specification as write block and write multiple block commands. Besides a write command, other commands could be used that are followed by an address field 304 and specified data field 306, which are accepted by the memory card or card reader. In one example, the address field 304 can contain an address in a normal area 606 of unprotected memory 605 for normal use, or in out of range area 611 within other area 610 of memory such as those shown in FIG. 6.

The specified data 306 includes a unique code, e.g., "XAX," that is recognized by the micro-controller in the memory cards. Referring to FIG. 1, this unique code can be preset in the firmware or firmware area 604 of memory card 600 (see, e.g., FIG. 6) located in protected area 602. When the firmware is loaded during operation, the micro-controller can be configured to recognize that code in the specified data field for releasing the protected area to allow write access to those areas. Exemplary methods of using the specified data for doing a memory access switch are described below regarding FIGS. 4-5.

Figure 6:
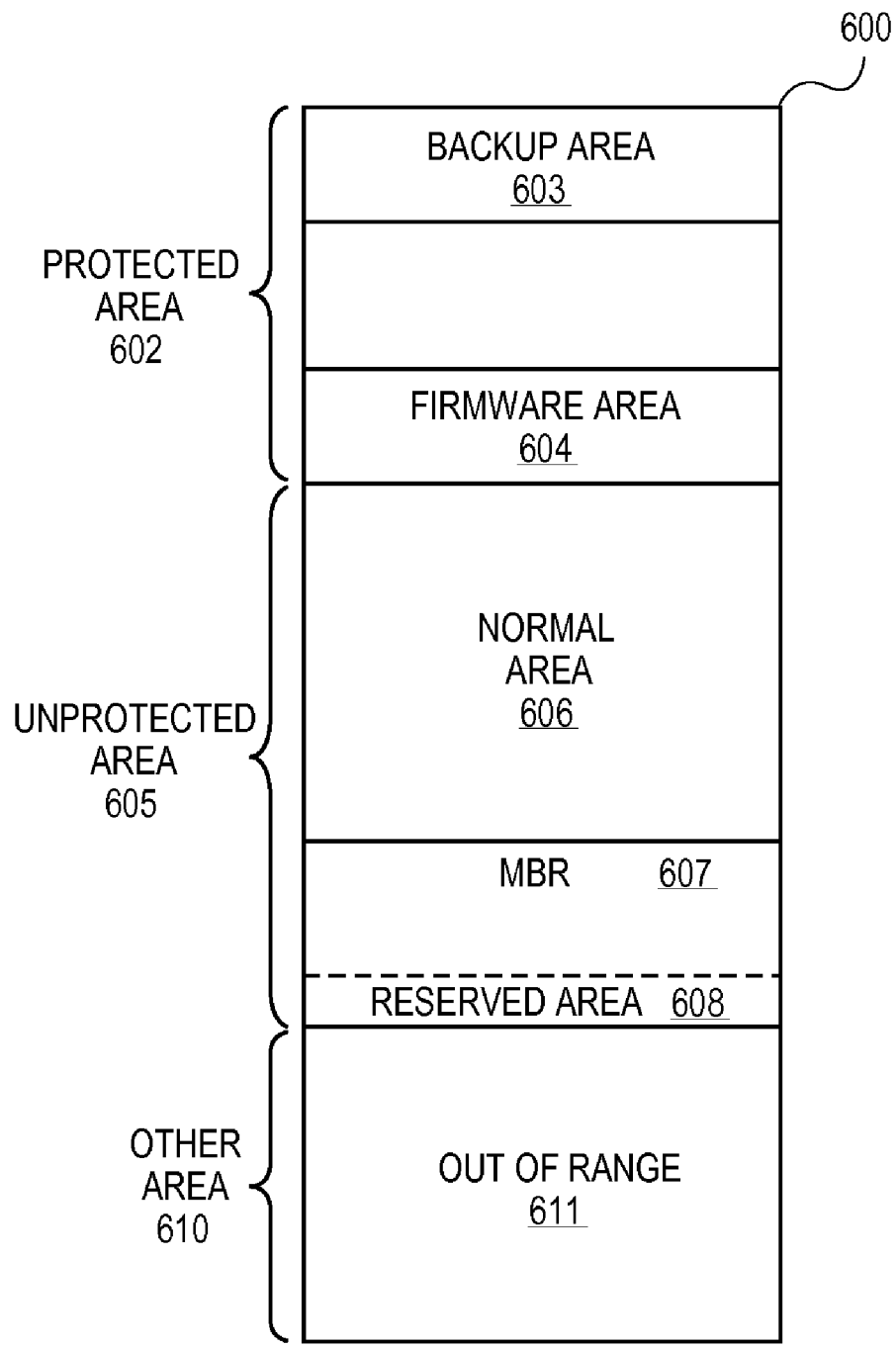
FIG. 6 illustrates an exemplary non-volatile memory having protected, unprotected, and other areas for memory use.

FIG. 4 illustrates an exemplary flow diagram of a method 400 for updating firmware or reorganizing memory. Initially, a memory card is powered on (step 402). In this power on step, the micro-controller will load firmware from firmware area 604 into the master boot record MBR 607 to begin operation as shown in FIG. 6. The firmware can be preset with a specified code in the MBR for allowing a memory access switch if received by the micro-controller. The memory card can be implemented in a system, e.g., as described in FIGS. 1 and 2.

Assuming firmware in the memory card needs to be updated, a host or card reader sends a write command, including an address and specified data, e.g., "XAX." In one example, the command, address, and specified data (write command) are transferred using the format shown in FIG. 3. Variations can implement where the address and data are embedded in the command. Then, the command, address, and specified data are received by the micro-controller in the memory card (step 404). Next, the micro-controller determines if the address for the write command is in the out of range area 611 shown in FIG. 6 (step 406). If the write command address is not in the out of range area 611, the method proceeds to step 502 of FIG. 5. If the write command address is in the out of range area 611, the micro-controller determines if the write command address is followed by specified data (step 408)—i.e., XAX. If there is no specified data, an out of range error is reported by the micro-controller (step 410).

If specified data does follow the write command, instead of having to use special commands and applications, the host or card reader can use a standard "write block" or "write multiple block" command, along with the specified data having a sequence of data recognized to allow the micro-controller to release the protected area 602 and to make a memory access switch for the unprotected area 605 to the protected area 602 (step 412). In the case where the correct specified data is received, e.g., "XAX," the micro-controller can set appropriate registers such that the micro-controller will access address space in the protected area 602 where firmware 604 is located in the memory card 600. For example, after receiving the XAX code, the micro-controller can have a pre-configured or translated address to load into appropriate registers such that the write command will write data in the address space for firmware 604 to either rewrite over it or part of it (step 414). Thus, referring to FIG. 6, a standard write command to write data in unprotected area 605 is switched to the protected area 602, if the correct specified data is received. That specified data can inform the micro-controller that the data for that write command is to rewrite data in the area where firmware 604 is located in memory card 600. Alternatively, memory switch can allow the micro-controller can consider portions of unprotected area 605 or other area 610 as protected memory areas or as back up memory blocks. For instance, this can allow for reorganizing portions of normal memory 408 as back memory blocks and be considered as protected memory areas.

Figure 5:
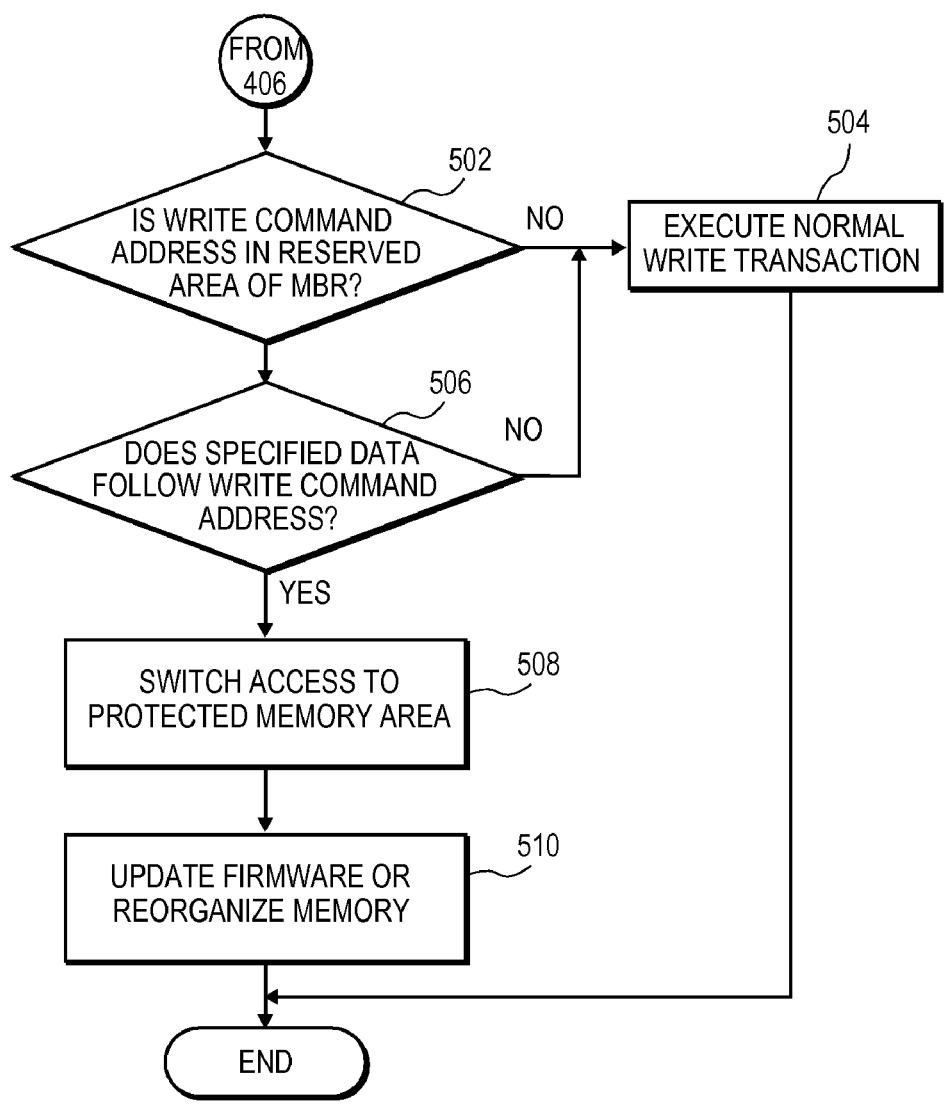
FIG. 5 illustrates an exemplary flow diagram of a method for routing bad memory to good memory.

FIG. 5 illustrates an exemplary flow diagram of a method starting from step 406 from FIG. 4. Initially, at step 502, the micro-controller determines if the write command address is in the reserved area 608 of the master boot record MBR 607 shown in FIG. 6. If the write command address is not in the reserved area 608, a normal write transaction is executed by the micro-controller (step 504). If the write command address is in the reserved area 608 of the MBR 607, the micro-controller determines if specified data follows the write command address (step 506). If no specified data follows the write command address, the method continues to step 504 where a normal write transaction is executed. If specified data does follow the write command, memory access is switched from unprotected area 605 to protected area 602 (step 508). Firmware can then be updated or memory reorganized (step 510) in the same manner as described above with respect to step 412 and 414 in FIG. 4. In one example, for steps 508 and 510, the micro-controller can identify bad memory blocks in normal area 606 of unprotected area 605 and route these bad memory blocks to blocks of memory in the other area 610 thereby reorganizing bad memory blocks, especially in the case that all of the back up area 603 in protected area 602 is being used.

In the examples of FIGS. 4 and 5, a firmware update can be performed in accordance with the method described in FIG. 4 and bad memory blocks in normal area 606 can be reorganized to good memory blocks in other area 610. Thus, a user need not have to buy a new memory card if there are bad memory blocks, but instead can have firmware route access from one memory area to another. These methods can be implemented in a system, e.g., as described in FIGS. 1 and 2.

Thus, assuming the memory card 600 has bad memory blocks in normal area 606 within unprotected area 605, a host or card reader can still send a write command, including an address for those bad memory blocks, but with specified data, e.g., "XAX." In one example, this information is a data format as shown in FIG. 3. The command, address, and specified data are received by a micro-controller in the memory card and determine if the command has an address designated for the normal area with bad memory blocks. In this case, micro-controller can route access from the bad memory blocks in the unprotected normal area 605 to the other area 610 having good memory blocks. In this manner, standard "write block" or "write multiple blocks" commands can still be used for addresses designated for bad memory blocks, along with specified data having a code that allows the micro-controller to make a memory access switch.

In the case where the specified data is received, e.g., "XAX," the micro-controller can set appropriate registers such that the micro-controller will access address space in the other area 610 where good memory blocks are located in the memory card 600. For example, after receiving the XAX code, the micro-controller can have a pre-configured or translated address to load into appropriate registers with the write command will write data in the address space located in the other area 610.

Thus, in the foregoing specification, the invention has been described with reference to specific examples and embodiments. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for a memory card, comprising:
    providing a memory card having a first area and a protected area including a firmware area;
    receiving a command to access the first area of the memory card;
    switching access from the first area of the memory card to the firmware area of the memory card if specified data follows the command allowing for the memory access switch, the specified data having a sequence of data recognized to release the protected area and to make a memory access switch to the protected area; and
    writing updated firmware over firmware stored in the firmware area according to the command and the specified data after the access is switched from the first area to the firmware area.

2. The method of claim 1, wherein the first area of memory includes at least one of an unprotected area and other area of memory.

3. The method of claim 2, wherein the unprotected area of memory includes at least one of a normal area, master boot record, and reserved area of memory and the other area of memory includes an out of range area of memory.

4. The method of claim 1, wherein the command includes a write command associated with an address designated for unprotected area of memory and associated with the specified data.

5. The method of claim 1, further comprising:
    determining if an address for the command is in an out-of-range area different from the protected area after the command is received; and
    determining if the command is followed by the specified data when the address for the command is in the out-of-range area.

6. A memory card, comprising:
a non-volatile memory having a first area and a second area including a protected area of memory, the protected area of memory including at least one of a backup area and a firmware area of memory;
a micro-controller configured to receive a command to access a first area of the memory card, and to switch access from the first area of the memory card to the firmware area of the memory card if specified data follows the command allowing for the memory access switch, the specified data having a sequence of data recognized to allow the micro-controller to release the protected area and to make a memory access switch to the protected area, wherein the micro-controller is configured to write updated firmware over firmware stored in the firmware area according to the command and the specified data after the access is switched from the first area to the firmware area.

7. The memory card of claim 6, wherein the first area of memory includes at least one of an unprotected area and other area of memory.

8. The memory card of claim 7, wherein the unprotected area of memory includes at least one of a normal area, master boot record, and reserved area of memory and the other area of memory includes an out of range area of memory.

9. The memory card of claim 6, wherein the command includes a write command associated with an address designated for unprotected area of memory and associated with the specified data.

10. The memory card of claim 6, wherein the micro-controller is configured to determine if an address for the command is in an out-of-range area different from the protected area after the command is received, and the micro-controller is further configured to determine if the command is followed by the specified data when the address for the command is in the out-of-range area.

11. A method for using a memory card, comprising:
receiving a write command to access bad memory blocks in memory and the memory having a protected area comprising a pre-designated back up area that is full;
determining if specified data follow the write command allowing for a memory access switch, the specified data having a sequence of data recognized to release the protected area and to make the memory access switch to the protected area;
switching access from the bad memory blocks to the protected area if the specified data follow the write command; and
reorganizing memory blocks in the memory and designating a portion of the reorganized memory blocks as back up memory blocks which is different from the pre-designated back up area, in the protected area, such that the access is switched from the bad memory blocks to the back up memory blocks.

12. The method of claim 11, wherein the bad memory blocks and the reorganized memory blocks are located in an unprotected area.

13. The method of claim 11, wherein the bad memory blocks are located in an unprotected area and the reorganized memory blocks are located in an other area.

14. The method of claim 11, wherein the write command is associated with an address designated for unprotected area of memory and associated with the specified data.

15. The method of claim 11, further comprising:
determining if an address for the write command is in an out-of-range area different from the protected area after the write command is received; and
determining if the write command is followed by the specified data when the address for the write command is in the out-of-range area.

16. A memory card, comprising:
a non-volatile memory having a protected area, a first area of memory having one or more bad memory blocks, and a second area of memory, wherein the protected area comprises a pre-designated back up area that is full; and
a micro-controller configured to receive a write command to access the one or more bad memory blocks in the first area of memory, configured to determine if specified data follow the write command allowing for a memory access switch wherein the specified data have a sequence of data recognized to release the protected area and to make the memory access switch to the protected area, and configured to switch access from the bad memory blocks to the protected area if the specified data follow the write command;
wherein the micro-controller is further configured to reorganize memory blocks in an area different from the protected area and to designate a portion of the reorganized memory blocks as back up memory blocks which is different from the pre-designated back up area, in the protected area, such that the access is switched from the bad memory blocks to the back up memory blocks.

17. The memory card of claim 16, wherein the write command is associated with an address designated for unprotected area of memory and associated with the specified data.

18. The memory card of claim 16, wherein the first area of memory is unprotected area of memory and the second area of memory is out of range.

19. The memory card of claim 16, wherein the micro-controller is configured to determine if an address for the write command is in an out-of-range area different from the protected area after the write command is received, and the micro-controller is further configured to determine if the write command is followed by the specified data when the address for the write command is in the out-of-range area.

* * * * *